US008466968B2

(12) United States Patent
Takagi et al.

(10) Patent No.: US 8,466,968 B2
(45) Date of Patent: Jun. 18, 2013

(54) IMAGE PROCESSING APPARATUS, METHOD OF CONTROLLING THE APPARATUS AND COMMUNICATION SYSTEM

(75) Inventors: Toshiyuki Takagi, Kawasaki (JP); Ikuo Niimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 12/836,112

(22) Filed: Jul. 14, 2010

(65) Prior Publication Data

US 2011/0037865 A1 Feb. 17, 2011

(30) Foreign Application Priority Data

Aug. 17, 2009 (JP) .................................. 2009-188705

(51) Int. Cl.
*H04N 5/225* (2006.01)
*H04N 5/232* (2006.01)

(52) U.S. Cl.
USPC .............. 348/207.11; 348/207.1; 348/211.99; 348/211.2

(58) Field of Classification Search
USPC ............... 348/207.99–207.2, 211.99–211.14, 348/333.01–333.02, 333.11; 710/8–19
See application file for complete search history.

(56) References Cited

U.S. PATENT DOCUMENTS

| 6,414,716 | B1 * | 7/2002 | Kawai ......................... 348/211.3 |
| 6,856,346 | B1 * | 2/2005 | Kobayashi et al. ....... 348/211.99 |
| 2001/0045983 | A1 * | 11/2001 | Okazaki et al. ............... 348/211 |
| 2004/0056964 | A1 * | 3/2004 | Kawai et al. ................ 348/211.1 |
| 2006/0067654 | A1 * | 3/2006 | Herberger et al. ............ 386/120 |
| 2006/0179169 | A1 | 8/2006 | Yamada |
| 2006/0203097 | A1 * | 9/2006 | Koga ......................... 348/211.3 |
| 2006/0242678 | A1 * | 10/2006 | Kostadinovich .............. 725/105 |

FOREIGN PATENT DOCUMENTS

JP 2006-248217 9/2006

* cited by examiner

*Primary Examiner* — Michael Osinski
(74) *Attorney, Agent, or Firm* — Cowan, Liebowitz & Latman, P.C.

(57) ABSTRACT

A camera that is connected to a PC via a network sends an action decision program in response to an operation screen request from the PC, and obtains a decision result from the PC 300 by causing the PC to execute the action decision program. Based on the thus obtained decision result, data of an operation screen for operating the camera 100 is sent to the PC. As a result, the PC displays the operation screen based on the data. The user of the PC can then remotely control the camera using the operation screen.

11 Claims, 8 Drawing Sheets

| DECISION FLAG FOR WHICH VALUE IS "ON" | ITEM THAT CAN BE OPERATED | OPERATION SCREEN |
|---|---|---|
| FLAG A | ITEM A | OPERATION SCREEN 1 |
| FLAG B | ITEM B | OPERATION SCREEN 2 |
| FLAG C | ITEM C | OPERATION SCREEN 3 |
| FLAG A, FLAG B | ITEM A, ITEM B | OPERATION SCREEN 4 |
| FLAG A, FLAG C | ITEM A, ITEM C | OPERATION SCREEN 5 |
| FLAG B, FLAG C | ITEM B, ITEM C | OPERATION SCREEN 6 |
| FLAG A, FLAG B, FLAG C | ITEM A, ITEM B, ITEM C | OPERATION SCREEN 7 |

FIG. 6B

| ITEM THAT CAN BE OPERATED | FUNCTION |
|---|---|
| ITEM A | IMAGE CAPTURE EXECUTION |
| ITEM B | IMAGE DISPLAY |
| ITEM C | PARAMETER ACQUISITION AND CHANGE |

FIG. 7

IMAGE PROCESSING APPARATUS, METHOD OF CONTROLLING THE APPARATUS AND COMMUNICATION SYSTEM

BACKGROUND OF THE INVENTION

1. Field of the Invention

The present invention relates to an image processing apparatus which can be remotely controlled from an information processing apparatus (PC) on a network, a method of controlling the image processing apparatus, and a communication system including the image processing apparatus.

2. Description of the Related Art

In recent years, it has become common for a user to access a camera via a network from an information processing apparatus in which a Web browser is installed and display an operation screen with the Web browser on the screen of the information processing apparatus, and use the operation screen to perform remote control of the camera. Examples of this kind of information processing apparatus include a personal computer (PC), a television, a cellular phone, a PDA and various other apparatuses. The Web browser implementation differs depending on the respective apparatus. For example, there are some apparatuses in which only a part of the functions of JavaScript is operable. Consequently, even if there is an item that uses a JavaScript function on the operation screen of the apparatus in question, in some cases the item may not be operable.

Technology has already been proposed in which apparatus information of an information apparatus is acquired by an external input/output device connected to the information processing apparatus, and an operation screen displayed by the information processing apparatus in accordance with the acquired apparatus information is selected by the user and displayed (Japanese Patent Laid-Open No. 2006-248217).

However, according to the above-described conventional technology, it is necessary to previously maintain a correspondence between the apparatus information and the set of usable functions, and it has not been possible to support apparatuses for which the apparatus information is unknown.

SUMMARY OF THE INVENTION

An aspect of the present invention is to eliminate the above-described problems with the conventional technology.

A feature of the invention of the present application is that the functions of an information processing apparatus that is connected via a network are determined, and an operation screen is provided that is optimal for the apparatus in question.

According to an aspect of the present invention, there is provided an image capturing apparatus being connected to an information processing apparatus via a network, the apparatus comprising:

a first transmission unit that, in response to a request from the information processing apparatus, transmits an action decision program to the information processing apparatus;

an obtaining unit that obtains an execution result of the action decision program that is implemented on the information processing apparatus, from the information processing apparatus; and a second transmission unit that transmits data of an operation screen for operating image capturing processing of the image capturing apparatus, that corresponds to the execution result obtained by the obtaining unit, to the information processing apparatus.

According to another aspect of the present invention, there is provided a communication system in which an image capturing apparatus and an information processing apparatus are connected via a network and the information processing apparatus can remotely control the image capturing apparatus, wherein the information processing apparatus comprises:

a request unit that requests data of an operation screen for the image capturing apparatus;

an execution unit that executes an action decision program;

a first transmission unit that transmits an execution result of the action decision program executed by the execution unit to the image capturing apparatus;

a first reception unit that receives data of an operation screen corresponding to the execution result from the image capturing apparatus;

a display control unit that displays the operation screen on a display unit based on the data received by the first reception unit; and an operation unit that operates image capturing processing of the image capturing apparatus by using the operation screen; and wherein the image capturing apparatus comprises:

a second reception unit that receives the execution result from the information processing apparatus; and a second transmission unit that transmits data of the operation screen corresponding to the received execution result to the information processing apparatus.

According to another aspect of the present invention, there is provided a control method of controlling an image capturing apparatus that is connected to an information processing apparatus through a network, the method comprising:

a first transmission step of transmitting an action decision program to the information processing apparatus in response to a request from the information processing apparatus;

an obtaining step of obtaining an execution result of the action decision program that is implemented on the information processing apparatus, from the information processing apparatus; and a second transmission step of transmitting data of an operation screen for operating image capturing processing of the image capturing apparatus, that corresponds to the execution result obtained in the obtaining step, to the information processing apparatus.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
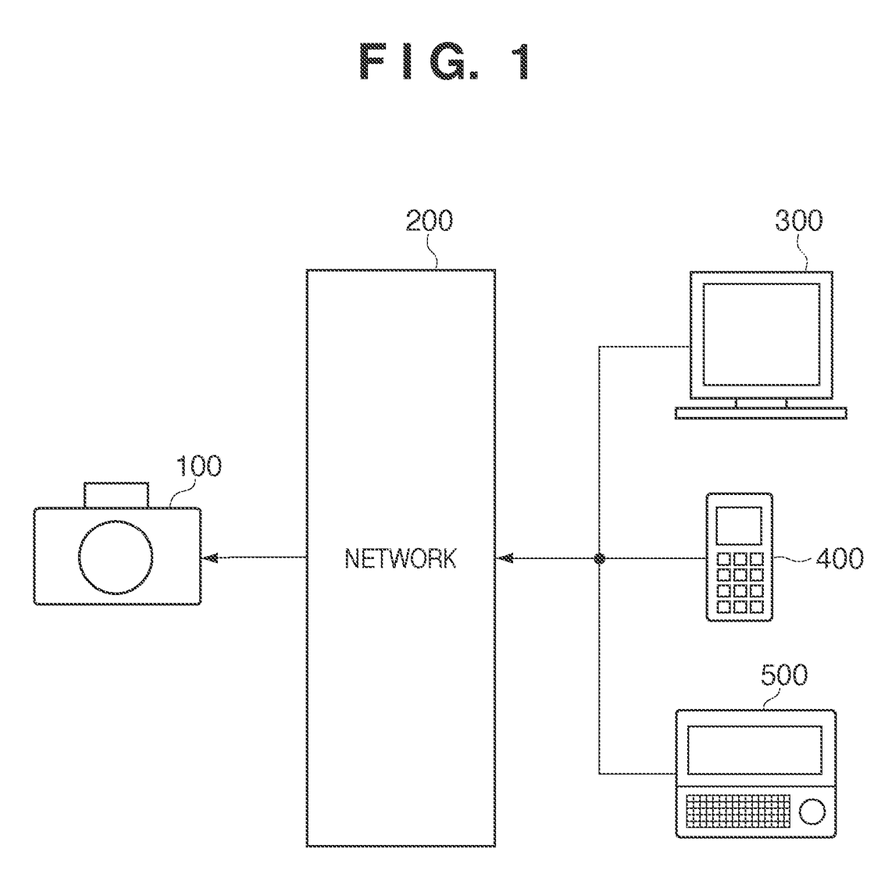
FIG. 1 depicts a view illustrating an overview of a communication system according to a first embodiment of the present invention.

FIG. 1 depicts a view illustrating an overview of a communication system according to a first embodiment of the present invention.

According to the first embodiment, a camera 100 that is an example of an image processing apparatus and an information processing apparatus are connected via a network 200 such as the Internet or a LAN. In this case, various devices such as a personal computer (hereunder referred to as "PC") 300, a cellular phone 400, and a PDA 500 may be mentioned as information processing apparatuses that communicate with the camera 100. Further, for example, the system may be one in which the camera 100 communicates directly with the PC 300, cellular phone 400, and PDA 500, respectively, as in the case of ad hoc communication over a wireless LAN. In this type of communication system, by remotely controlling the camera 100 via the network 200, each information processing apparatus can acquire image data that has been captured with the camera 100 and display the image data on the screen of the information processing apparatus. When performing remote control, the relevant information processing apparatus displays an operation screen for remotely controlling the camera 100 on the screen thereof, and the user can remotely control the camera 100 using the operation screen.

Figure 2A:
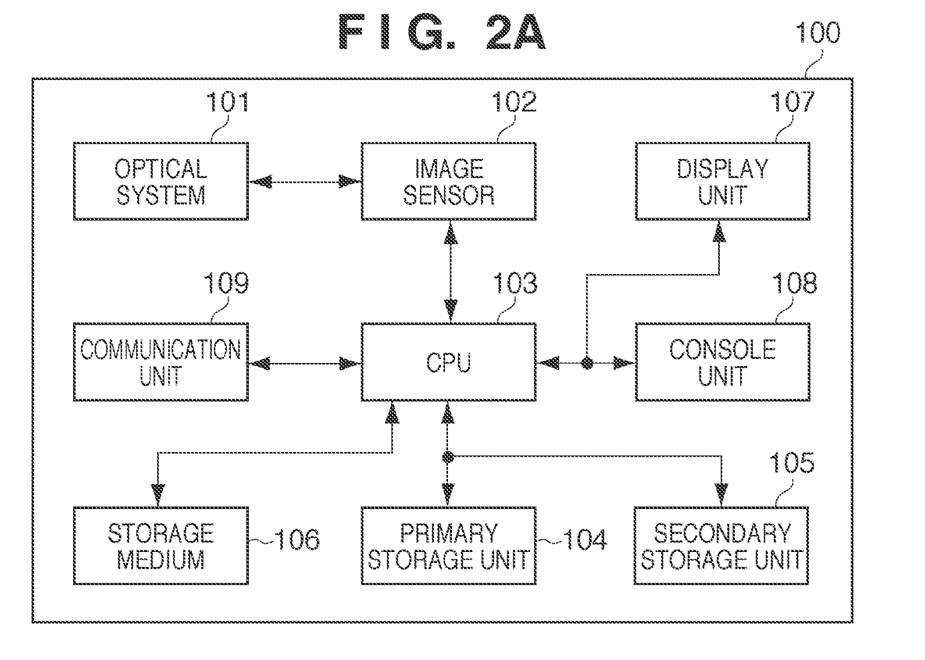
FIGS. 2A and 2B are block diagrams that respectively illustrate the configuration of a camera and a PC according to the first embodiment.

FIG. 2A is a block diagram describing the configuration of the camera 100 that is one example of an image processing apparatus according to the first embodiment.

The camera 100 is an image capturing apparatus such as a digital camera or a digital video camera that captures an image of a subject in order to obtain image data. The camera 100 includes an optical system 101 such as a photographing lens, an image sensor 102, a CPU 103, a primary storage unit 104, a secondary storage unit 105, a storage medium 106, a display unit 107, a console unit 108, and a communication unit 109. The optical system 101 includes a lens, a shutter, and an aperture, and forms an image on the image sensor 102 at an appropriate timing with an appropriate amount of light from a subject. The image sensor 102 is a CCD sensor of the like, and converts a light that has been formed into an image through the optical system 101 into an image signal. In accordance with an input signal and a program stored in the primary storage unit 104, the CPU 103 controls various kinds of calculations and various portions that constitute the camera 100. The primary storage unit 104 stores temporary data and is used for work of the CPU 103. The secondary storage unit 105 stores a program (firmware) for controlling the camera 100 and various kinds of setting information.

The storage medium 106 stores captured image data and the like. The storage medium 106 can be removed from the camera 100 after capturing an image, and the storage medium 106 can be inserted into the PC 300 to read data directly from the storage medium 106. The display unit 107 displays a viewfinder image when capturing an image, displays a captured image, and displays characters for interactive operations. The camera 100 need not necessarily be equipped with the display unit 107, and it is sufficient that the camera 100 has a display control function that controls the display of the display unit 107. The console unit 108 is a unit for accepting user instructions. The console unit 108 includes, for example, a button, a lever, a touch panel, or the like. The communication unit 109 communicates with an external apparatus to send and receive control commands and data. In this case, for example, PTP (Picture Transfer Protocol) or HTTP is used as a protocol for performing data communication. The communication unit 109 may also perform communication by a wired connection such as, for example, a USB (Universal Serial Bus) cable. Further, the communication unit 109 may perform communication by a wireless connection such as a wireless LAN. Furthermore, the communication unit 109 may be directly connected to an external apparatus, or may be connected to an external apparatus through a network such as the Internet via a server. According to the first embodiment it is assumed that communication is performed using HTTP.

Figure 2B:
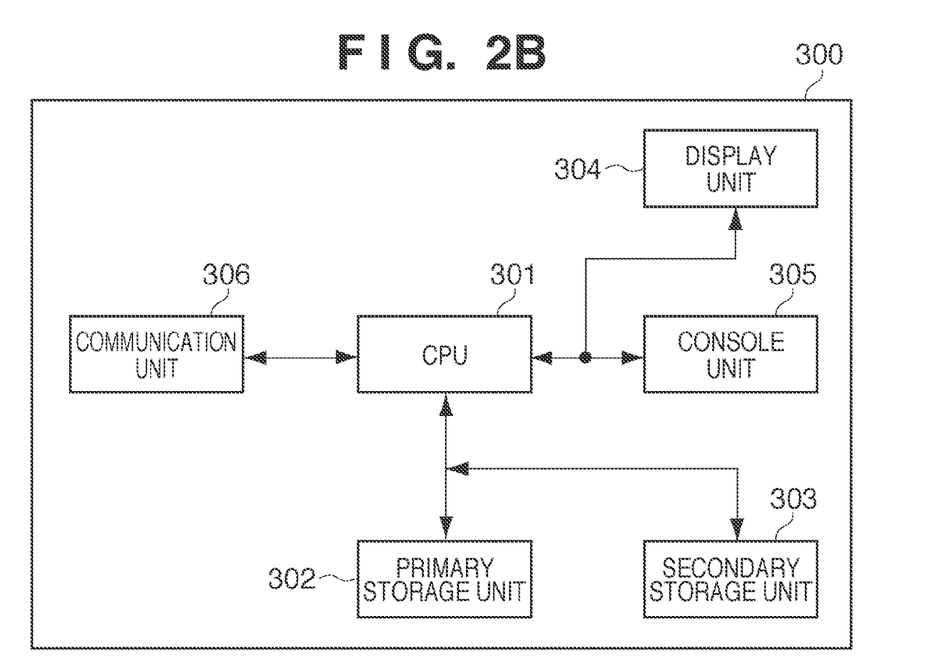

FIG. 2B is a block diagram describing the configuration of an information processing apparatus (PC) 300 according to the first embodiment. In this case, the PC 300, the cellular phone 400, and the PDA 500 are regarded as having the same basic configuration, even though there is a difference in performance between these devices. The information processing apparatus (PC) 300 is described herein as one example.

The PC 300 includes a CPU 301, a primary storage unit 302, a secondary storage unit 303, a display unit 304, a console unit 305, a communication unit 306 and the like. In accordance with a program stored in the primary storage unit 302, the CPU 301 controls various kinds of calculations and various portions of the PC 300. The primary storage unit 302 stores temporary data and is used for work of the CPU 301. The secondary storage unit 303 stores a program for controlling the PC 300 and various kinds of setting information. The program is loaded to the primary storage unit 302 from the secondary storage unit 303 at the time of execution, and executed by the CPU 301. A display apparatus such as an LCD is used as the display unit 304. The PC 300 need not necessarily be equipped with the display unit 304, and it is sufficient that the PC 300 has a display control function that controls the display of the display unit 304. A keyboard, a mouse, attached buttons, a touch panel or the like can be used as the console unit 305. The communication unit 306 communicates with an external apparatus to send and receive control commands and data.

Figure 3A:
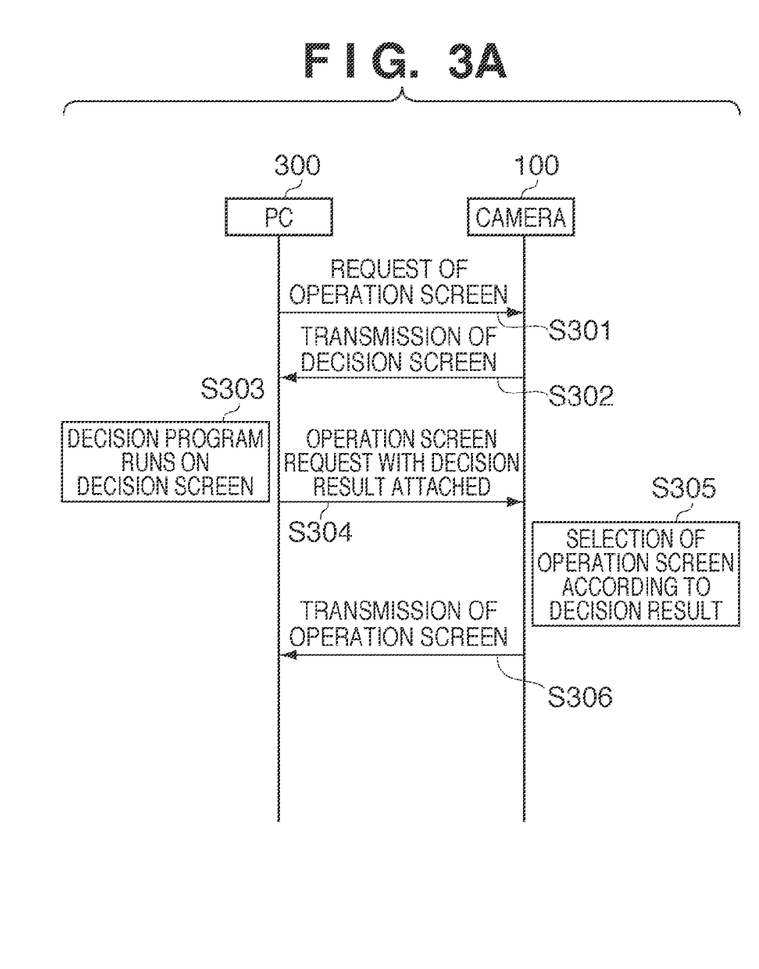
FIGS. 3A and 3B depict views describing a communication sequence between a camera and a PC according to the first embodiment.
Figure 3B:
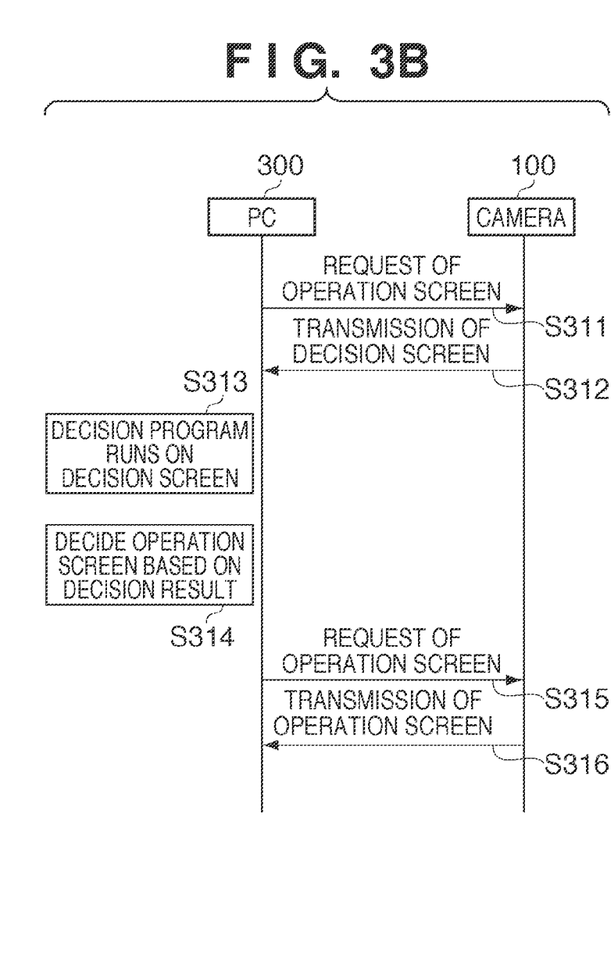

FIG. 3A and FIG. 3B depicts views describing a communication sequence between the camera 100 and the PC 300 according to the first embodiment. In this case, processing is described in which the PC 300 issues a request to the camera 100 to send an operation screen, and the camera 100 sends an operation screen to the PC 300. Although in the following description it is assumed that the PC 300 as one example of an information processing apparatus communicates with the camera 100, the same operations are also executed when the cellular phone 400 and the PDA 500 that are other information processing apparatuses communicate with the camera 100.

In step S301 in FIG. 3A, the communication unit 306 of the PC 300 sends a request to the camera 100 to send an operation screen. In response to this send request, in step S302 the camera 100 sends a Web browser decision screen to the PC 300 using the communication unit 109. In step S303, the PC 300 receives the Web browser decision screen, and runs an action decision program of the Web browser on the Web browser decision screen. Next, after start of the action decision program of the Web browser, in step S304 the PC 300 sends a request to the camera 100 for an operation screen, and attaches the decision result to the request. In step S305, the camera 100 acquires the decision result from the PC 300 and selects an operation screen based on the decision result. In step S306, the camera 100 sends the selected operation screen to the PC 300 via the communication unit 109. The processing to select the operation screen on the PC 300 is described later. In this connection, in step S305, the camera 100 may previously hold data of a plurality of operation screens that have different items that can be operated on the operation screen in, for example, the secondary storage unit 105, and may select data for the corresponding operation screen based on the decision result received in step S304.

The foregoing describes a communication sequence between the camera 100 and the PC 300. According to the example shown in FIG. 3A, the camera 100 determines which operation screen is to be used on the PC 300. In this respect, a configuration may also be adopted in which the operation screen to be acquired is determined based on the decision result of the Web browser on the PC 300, and a request is then sent to the camera 100. The sequence in this case is described next referring to FIG. 3B.

Steps S311 to S313 in FIG. 3B are the same as steps S301 to S303 in FIG. 3A. In step S311, the communication unit 109 of the camera 100 receives a request to send an operation screen from the PC 300. In step S312, the camera 100 sends a decision screen of a Web browser to the PC 300 using the communication unit 109. In step S313, the PC 300 receives the Web browser decision screen from the camera 100, and runs a Web browser decision program on the Web browser decision screen. Next, in step S314, the PC 300 selects an operation screen based on the result of executing the decision program. In step S315, the PC 300 sends a request for an operation screen to the camera 100 based on the decision result. In step S316, the camera 100 sends the operation screen requested by the PC 300 to the PC 300 using the communication unit 109.

The Web browser decision processing of the PC 300 in this case (step S314) may be performed each time the PC 300 requests an operation screen from the camera 100. Alternatively, authentication may be initially performed at the time of an access from the PC 300 to the camera 100 (step S315), and the decision processing of the Web browser may be performed at that time. Further, a decision result that has been obtained by making a decision one time may be stored as a cookie in a storage area of the PC 300.

Figure 4:
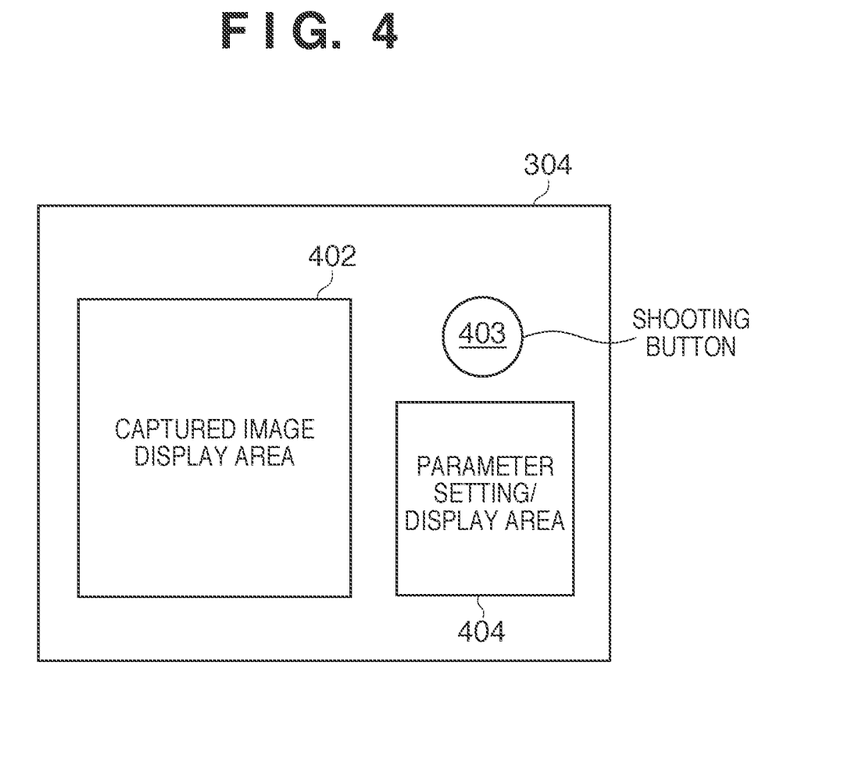
FIG. 4 depicts a view illustrating an example of an operation screen that is displayed on a display unit of a PC.

FIG. 4 depicts a view illustrating an example of an operation screen that is displayed on the display unit 304 of the PC 300.

The operation screen according to the first embodiment is a Web screen that the PC 300 generates with JavaScript. A captured image display area 402, a shooting button 403, and a parameter setting/display area 404 are displayed on the operation screen shown in FIG. 4. These areas and button are referred to as "objects". A plurality of parameter icons such as an AV value (aperture value), a TV value (shutter speed), and an ISO are displayed in the parameter setting/display area 404. Each of these parameter icons is handled as an object.

The following processing is executed in accordance with an operation by an operator of the PC 300, with respect to the captured image display area 402, the shooting button 403, and the parameter setting/display area 404 on the operation screen.

(1) Shooting Button 403

When the shooting button 403 is designated by the operator, an image capture request is sent from the PC 300 to the camera 100. The camera 100 performs photographing processing in response to the image capture request, and the image data captured in this manner is sent from the camera 100 to the PC 300. The PC 300 receives and displays the image data. At this time, the PC 300 displays the received image data in the captured image display area 402 without changing the operation screen.

(2) Captured Image Display Area 402

The captured image display area 402 displays received image data that has been captured by the camera 100.

(3) Parameter Setting/Display Area 404

The parameter setting/display area 404 receives and displays parameters that are set at the camera 100.

Figure 5:
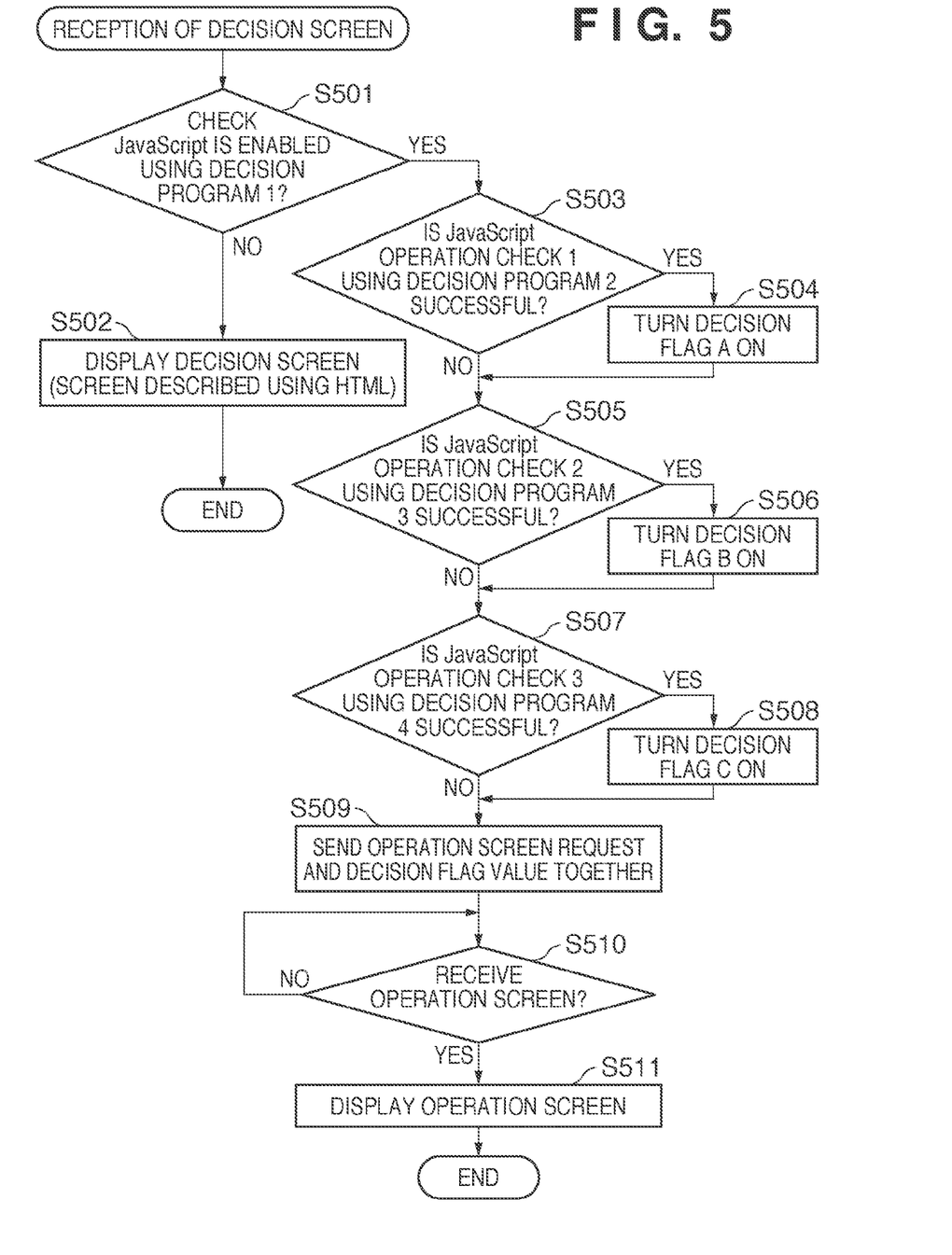
FIG. 5 is a flowchart describing processing of a PC.

FIG. 5 is a flowchart describing processing when the PC 300 receives a Web browser decision screen according to the first embodiment. A program that executes this processing is received from the camera 100 and stored in the secondary storage unit 303, and is executed under control of the CPU 301.

This processing is started when the PC 300 receives a decision screen that is sent from the camera 100 in step S302 in FIG. 3A or step S312 in FIG. 3B. First, in step S501, a decision program 1 is executed in which the PC 300 checks the settings of the Web browser to determines whether or not JavaScript is enabled. In this case, if the decision result of the decision program 1 is that JavaScript is disabled, the processing advances to step S502 to display a decision screen on the display unit 304. When JavaScript is disabled, a HTML script that renders a screen on the Web browser is used for the decision screen. Thus, when the result of the decision program 1 is that JavaScript is not enabled, a screen generated using HTML is displayed.

In contrast, if the decision result of the decision program 1 is that JavaScript is enabled, the processing advances to step S503 to execute a decision program 2. In this case, an attempt is made to execute a program for sending a HTTP request to the camera 100 and receive a response without performing a "page transition" that rewrites the contents of a page inside the same window, and it is determine whether or not the program could be executed. If the result of the decision program 2 indicates that execution is possible, the processing advances to step S504 to turn on a decision flag A. If the result of the determination in step S503 is that execution is not possible, or after executing step S504, the processing advances to step S505 to execute a decision program 3. In this case, an attempt is made to execute a program that generates an object at the PC 300, and it is determined whether or not the program can be executed. If the result of the decision program 3 indicates that execution is possible, the processing advances to step S506 to turn on a decision flag B.

If the result of the determination in step S505 is that execution is not possible, or after executing step S506, the processing advances to step S507 to execute a decision program 4. In this case, an attempt is made to execute a program that changes an object at the PC 300. If the result of the decision program 4 indicates that execution is possible, the processing advances to step S508 to turn on a decision flag C. After executing decision programs 1 to 4 in this manner, in step S509 the PC 300 sends the decision flags to the camera 100 together with a request for an operation screen. In this case, a configuration may be adopted in which the PC 300 sends only decision flags that have been set to "on" as a determination result to the camera 100.

The camera 100 holds a plurality of operation screens that have different items that can be operated, and selects an operation screen based on the values of decision flags that are sent in step S509. The camera 100 sends the selected operation screen to the PC 300.

Figure 6A:
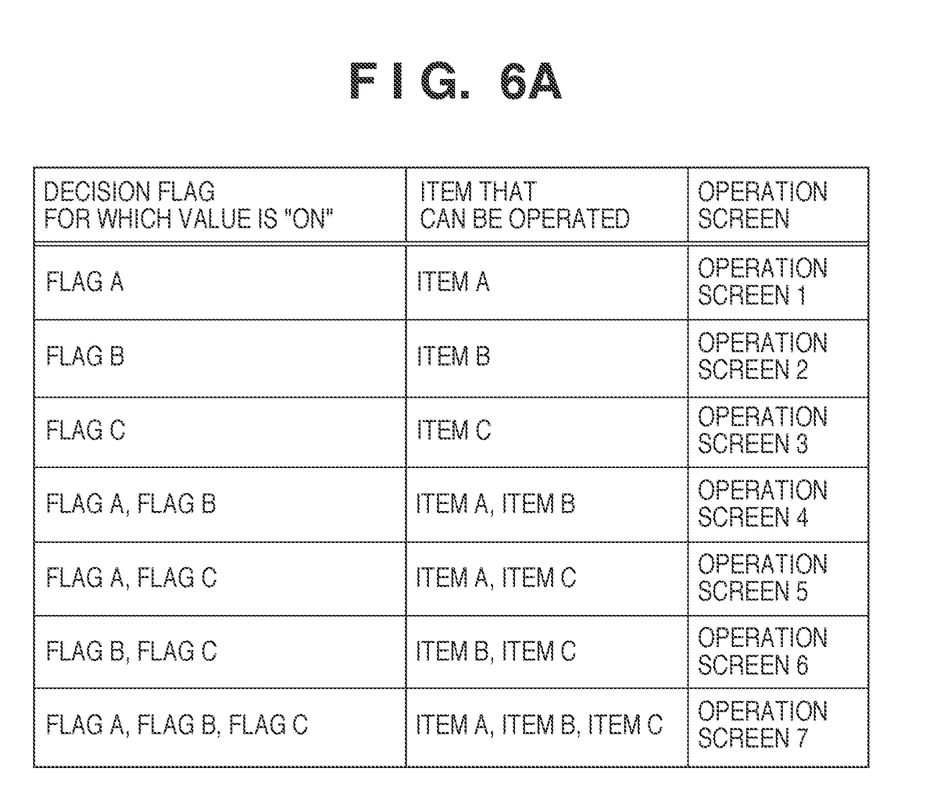
FIGS. 6A to 6B depict views describing items that can be operated and an operation screen corresponding to decision flags A to C.
Figure 6B:
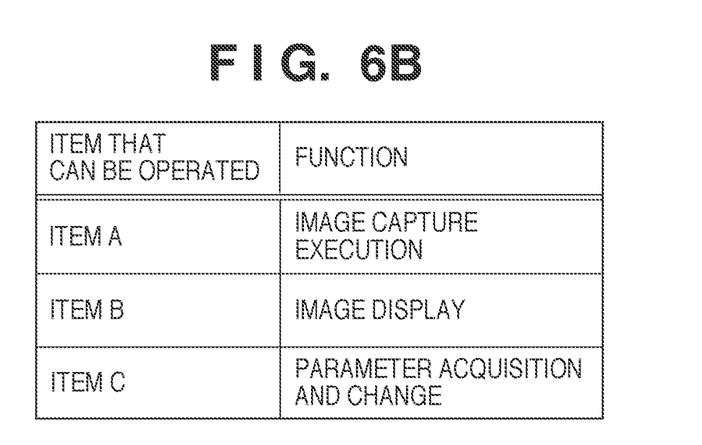

FIG. 6A and FIG. 6B depict views describing items that can be operated and operation screens corresponding to decision flags A to C that have been turned on.

The display of the captured image display area 402, the shooting button 403, and the parameter setting/display area 404 on the operation screen shown in FIG. 4 is controlled in accordance with the items that can be operated. For example, an item that can not be operated among the captured image display area 402, the shooting button 403, and the parameter setting/display area 404 is not displayed, or alternatively an item that can not be operated is displayed in a grayed-out state or the like so that the item can not be selected.

According to the example in FIG. 6A, when the decision flag A is on, an item A can be operated and the operation screen 1 is selected. When the decision flag B is on, an item B can be operated and the operation screen 2 is selected. When the decision flag C is on, an item C can be operated and the operation screen 3 is selected.

FIG. 6B shows specific examples of the functions of the items A to C. For example, the function of item A is "image capture execution", the function of item B is "image display", and the function of item C is "parameter acquisition and change".

When all of the decision flags A to C are on, all of the items A, B, and C can be operated, and an operation screen 7 (operation screen on which the area 402 and 404 and the button 403 are displayed as shown in FIG. 4) is selected. When the result of a decision of the Web browser is that "image display" and "parameter acquisition and change" are not possible, an operation screen is displayed on which only "image capture execution" is available for operation. In this case, only the decision flag A is on, and the camera 100 selects the operation screen 1 (for example, the operation screen shown in FIG. 4 on which only the shooting button 403 is displayed).

When the result of the decision of the Web browser is that "image capture execution" is not possible and "image display" and "parameter acquisition and change" are available, it indicates that the decision flag B and the decision flag C are on. In this case, the camera 100 selects the operation screen 6 (for example, the operation screen shown in FIG. 4 from which the shooting button 403 has been deleted).

Thus, the camera 100 can send an operation screen that is consistent with the operations of the PC 300 to the PC 300.

In this manner, the camera 100 selects an operation screen and sends the selected operation screen to the PC 300. As a result, upon receiving the operation screen in step S510 in FIG. 5, the PC 300 advances to step S511 to display the received operation screen on the display unit 304. In this case, for example, when all the decision flags are on, the operation screen 7 (corresponds to FIG. 4) in FIG. 6A is displayed. On this operation screen, it is possible to use a JavaScript function to alter a section of the operation screen in accordance with a user instruction at the PC 300. In this connection, each of the above described decision flags is stored in the primary storage unit 302.

Figure 7:
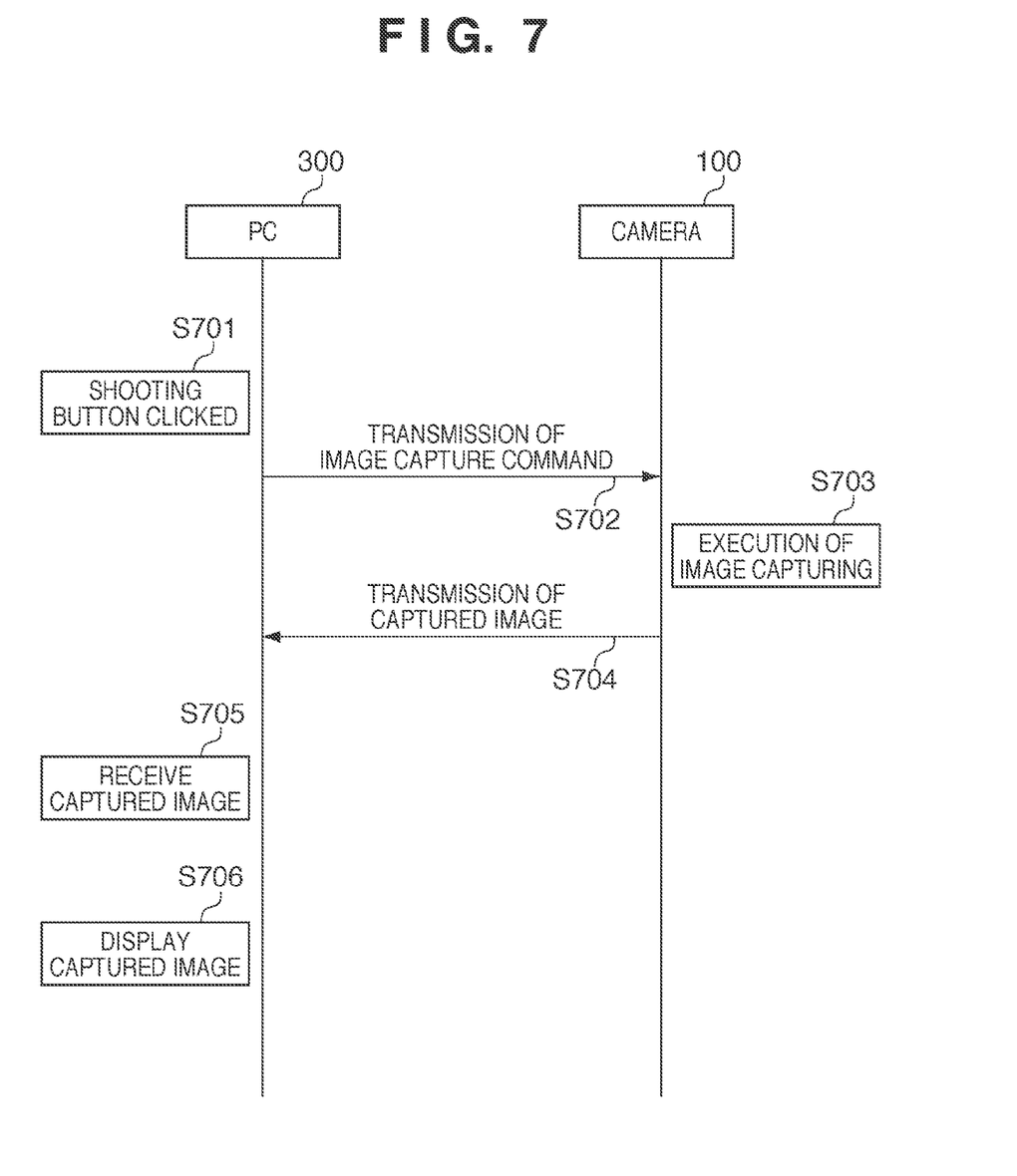
FIG. 7 depicts a view describing a flow of photographing processing in which a PC receives image data from a camera.

FIG. 7 depicts a view describing a flow of photographing processing in which the PC 300 sends an image capture command to the camera 100, and receives image data from the camera 100 according to the first embodiment.

In step S701, in response to a user instruction, the shooting button 403 is designated (clicked or touched) on the operation screen of the PC 300. As a result, in step S702, the PC 300 sends an image capture command to the camera 100. The camera 100 receives the image capture command and captures an image (step S703). After capturing an image, in step S704 the camera 100 sends the captured image data to the PC 300. The PC 300 receives the image data (step S705), and in step S706 displays the received captured image in the captured image display area 402 of the operation screen. At this time, only the captured image display area 402 of the operation screen is updated.

Although four decision programs are described according to the first embodiment, the number of decision programs may be less than or greater than four. Further, a decision other than a decision regarding JavaScript operation may be made, for example, a decision regarding whether a cookie is enabled or disabled.

According to the first embodiment as described above, an operation screen that is in accordance with a Web browser of an information processing apparatus that is connected to an image capturing apparatus through a network can be sent by the image capturing apparatus to the information processing apparatus and displayed by the information processing apparatus. As a result, the information processing apparatus can display an optimal operation screen for the information processing apparatus, and enable remote control of the image capturing apparatus and acquisition of an image that is captured by the image capturing apparatus.

Next, a second embodiment of the present invention is described. The configuration of a communication system and the camera 100 and information processing apparatuses 300, 400, and 500 according to the second embodiment is the same as in the above first embodiment, and hence a description thereof is omitted hereunder. According to the second embodiment, when making a decision of a Web browser using a plurality of conditions, an operation screen that displays all the functions is displayed when all the decisions indicate that the respective functions are executable, and if even one of the functions is not executable an operation screen that limits the functions is displayed.

Figure 8:
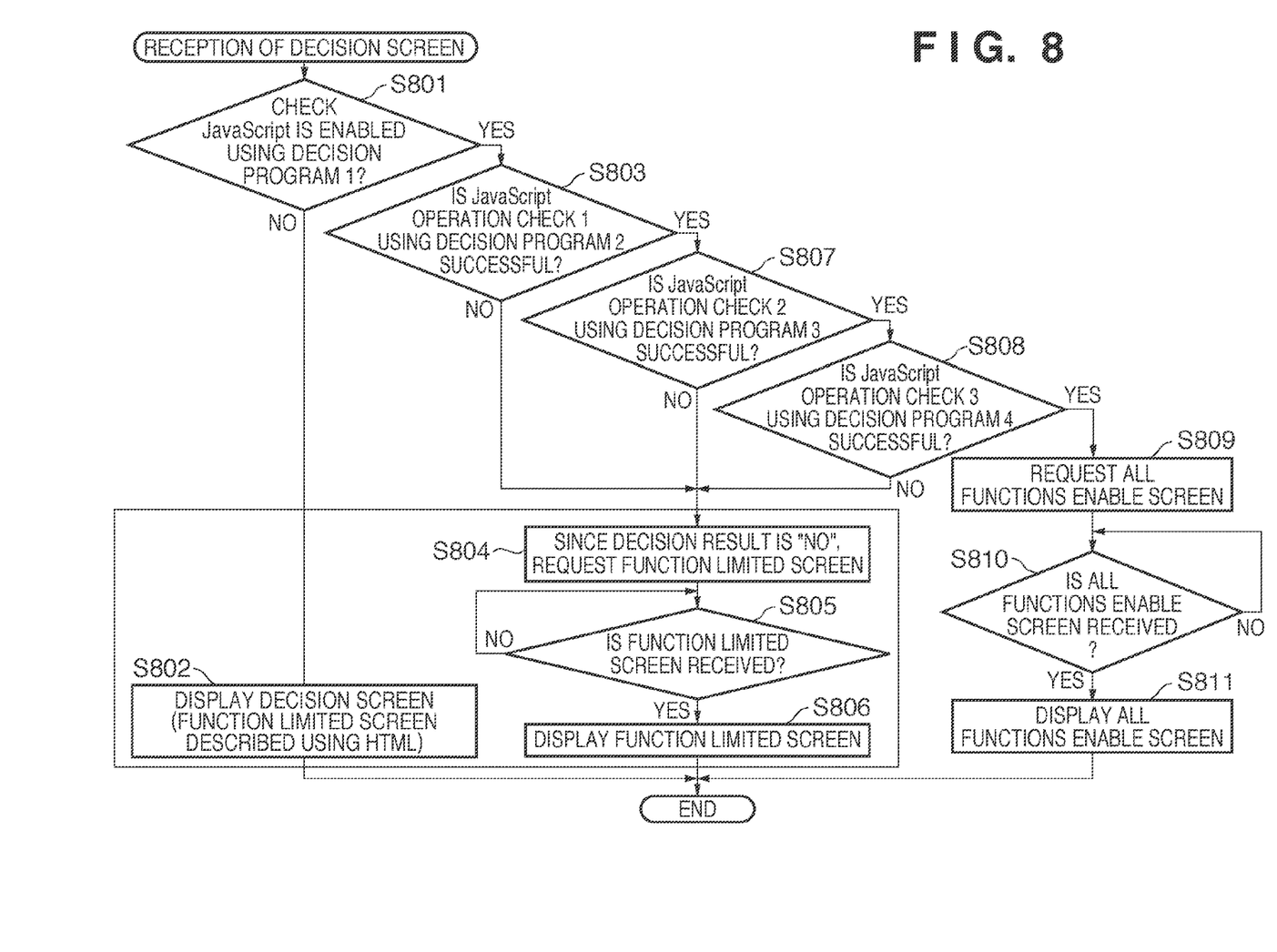
FIG. 8 is a flowchart describing processing of a PC according to a second embodiment.

FIG. 8 is a flowchart describing processing when the PC 300 receives a Web browser decision screen according to the second embodiment. A program that executes this processing is received from the camera 100, is stored in the secondary storage unit 303, and is executed under control of the CPU 301.

This processing is started when the PC 300 receives a decision screen that is sent from the camera 100 in step S302 in FIG. 3A and step S312 in FIG. 3B. First, in step S801, a decision program 1 is executed. When the decision result of the decision program 1 indicates that execution is not possible, the processing advances to step S802 to display a decision screen in a similar manner as in step S502 in FIG. 5.

If the decision result of the decision program 1 indicates that execution is possible, the processing advances to step S803 to execute the decision program 2. If the result of the decision program 2 indicates that execution is not possible, the processing advances to step S804. In step S804, the PC 300 sends a request to the camera 100 for an operation screen on which functions are limited. Upon receiving the operation screen on which functions are limited from the camera 100 in step S805, the processing advances to step S806 to display the received operation screen on the PC 300.

In contrast, in step S803, if the result of the decision program 2 indicates that execution is possible, the processing advances to step S807 to execute the decision program 3. If the result of the decision program 3 indicates that execution is not possible, the processing advances to step S804. As described above, in step S804 the PC 300 sends a request to the camera 100 for an operation screen on which functions are limited. In contrast, if the result of the decision program 3 indicates that execution is possible, the processing advances to step S808 to execute the decision program 4. If the result of the decision program 4 indicates that execution is not possible, the processing advances to step S804 to execute the aforementioned processing.

In step S808, if the result of the decision program 4 indicates that execution is possible, it represents that all the decision results of the decision programs 1 to 4 indicate that execution is possible. Consequently, the processing advances to step S809. In step S809, the PC 300 requests the camera 100 to send an operation screen (all functions enable screen) in which all functions are enabled. Next, in step S810, the PC 300 receives the operation screen in which all functions are enabled from the camera 100. Thereafter, the processing advances to step S811 in which the PC 300 displays the operation screen in which all functions are enabled on the display unit 304.

In this connection, although the decision screen sent from the camera 100 to the PC 300 in step S302 in FIG. 3A or step S312 in FIG. 3B and the function limited screen received in step S805 in FIG. 8 are different as data files, the display contents thereof are the same. Further, the decision screen and the function limited screen can be screens that are generated by using HTML without using JavaScript, and the all functions enable screen can be a screen that uses JavaScript. More specifically, when the camera 100 determines based on a decision result that the PC 300 has a predetermined capability, the camera 100 sends data of an operation screen that allows a user of the PC 300 to edit the operation screen to the PC 300. Further, on a decision screen or a function limited screen generated using HTML, an error message or warning may be displayed to notify the user that not all of the functions can be used.

The present invention has been described in detail above based on preferred embodiments thereof. However, it should be understood that the present invention is not limited to these specific embodiments, and the present invention also includes various forms within a range that does not depart from the spirit and scope of the present invention. The present invention may also be realized by suitably combining parts of the above described embodiments.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188705, filed Aug. 17, 2009, which is hereby incorporated by reference herein in its entirety.

What is claimed is:

1. An image capturing apparatus being connected to an information processing apparatus via a network, the image capturing apparatus comprising:
   a first transmission unit that, in response to a request from the information processing apparatus, transmits an action decision program to the information processing apparatus;
   an obtaining unit that obtains an execution result of the action decision program that is implemented on the information processing apparatus, from the information processing apparatus; and
   a storage unit that stores data of a plurality of operation screens for operating image capturing processing of the image capturing apparatus such that the operation screens respectively display different operable items from each other in accordance with each of execution results of the action decision program,
   wherein the first transmission unit also transmits to the information processing apparatus data of an operation screen read from the storage unit in accordance with the execution result obtained by the obtaining unit, and
   wherein the action decision program includes a plurality of small programs, each program checking each of a plurality of functions of the information processing apparatus,
   the obtaining unit obtains an execution result with respect to each small program, and the storage unit stores the data of the plurality of the operation screens in correspondence with an execution result of each respective small program.

2. The image capturing apparatus according to claim 1, wherein the operation screens respectively display items on which the information processing apparatus is operable with respect to image capturing processing of the image capturing apparatus, or image data obtained from the image capturing apparatus.

3. The image capturing apparatus according to claim 1, wherein the action decision program is a program for determining a function in which the information processing apparatus utilizes.

4. The image capturing apparatus according to claim 3, wherein the function includes at least one of functions which enable JavaScript, receive a response without performing a page transition, generate an object and change an object.

5. The image capturing apparatus according to claim 1, wherein if it is determined based on the decision result that the information processing apparatus has a capability to edit data of an operation screen, the second transmission unit transmits data of an operation screen with which the information processing apparatus can edit the operation screen.

6. A communication system in which an image capturing apparatus and an information processing apparatus are connected via a network and the information processing apparatus can remotely control the image capturing apparatus,
   wherein the information processing apparatus comprises:
   a request unit that requests data of an operation screen for operating image capturing processing of the image capturing apparatus;
   an execution unit that executes an action decision program sent from the image capturing apparatus;
   a first transmission unit that transmits an execution result of the action decision program executed by the execution unit to the image capturing apparatus;

a first reception unit that receives data of an operation screen corresponding to the execution result from the image capturing apparatus;
a display control unit that displays the operation screen on a display unit based on the data received by the first reception unit; and
an operation unit that operates image capturing processing of the image capturing apparatus by using the operation screen; and
wherein the image capturing apparatus comprises:
a storage unit that stores data of a plurality of operation screens for operating image capturing processing of the image capturing apparatus such that the operation screens respectively display different operable items from each other in accordance with each of execution results of the action decision program,
a second reception unit that receives the execution result from the information processing apparatus; and
a second transmission unit that transmits to the information processing apparatus data of an operation screen read from the storage unit in accordance with the execution result received by the second reception unit,
wherein the action decision program includes a plurality of small programs, each program checking each of a plurality of functions of the information processing apparatus,
the second reception unit receives an execution result with respect to each small program, and the storage unit stores the data of the plurality of the operation screens in correspondence with an execution result of each respective small program.

7. A control method of controlling an image capturing apparatus that is connected to an information processing apparatus through a network and stores data of a plurality of operation screens for operating image capturing processing of the image capturing apparatus in a memory such that the operation screens respectively display different operable items from each other in accordance with each of execution results of an action decision program, the method comprising:
transmitting the action decision program to the information processing apparatus in response to a request from the information processing apparatus;
obtaining an execution result of the action decision program that is implemented on the information processing apparatus, from the information processing apparatus; and
reading data of an operation screen from the memory in accordance with the execution result obtained in the obtaining step and transmitting the data of the operation screen to the information processing apparatus,
wherein the action decision program includes a plurality of small programs, each program checking each of a plurality of functions of the information processing apparatus,
the obtaining step obtains an execution result with respect to each small program, and the memory stores the data of the plurality of the operation screens in correspondence with an execution result of each respective small program.

8. A computer readable non-transitory storage medium that stores a program for causing a computer to execute a control program that controls an image capturing apparatus that is connected to an information processing apparatus via a network and stores data of a plurality of operation screens for operating image capturing processing of the image capturing apparatus in a memory such that the operation screens respectively display different operable items from each other in accordance with each of execution results of an action decision program, the control method comprising:
transmitting the action decision program to the information processing apparatus in response to a request from the information processing apparatus;
obtaining an execution result of the action decision program that is implemented on the information processing apparatus, from the information processing apparatus; and
reading data of an operation screen from the memory in accordance with the execution result obtained in the obtaining step and transmitting the data of the operation screen to the information processing apparatus,
wherein the action decision program includes a plurality of small programs, each program checking each of a plurality of functions of the information processing apparatus,
the obtaining step obtains an execution result with respect to each small program, and the memory stores the data of the plurality of the operation screens in correspondence with an execution result of each respective small program.

9. The method according to claim 7, wherein the operation screens respectively display items on which the information processing apparatus is operable with respect to image capturing processing of the image capturing apparatus, or image data obtained from the image capturing apparatus.

10. The method according to claim 7, wherein the action decision program is a program for determining a function in which the information processing apparatus utilizes.

11. The method according to claim 10, wherein the function includes at least one of functions which enable JavaScript, receive a response without performing a page transition, generate an object and change an object.

* * * * *